Jan. 15, 1952     E. C. REYNOLDS     2,582,505
FEEDER
Filed April 29, 1949     2 SHEETS—SHEET 1
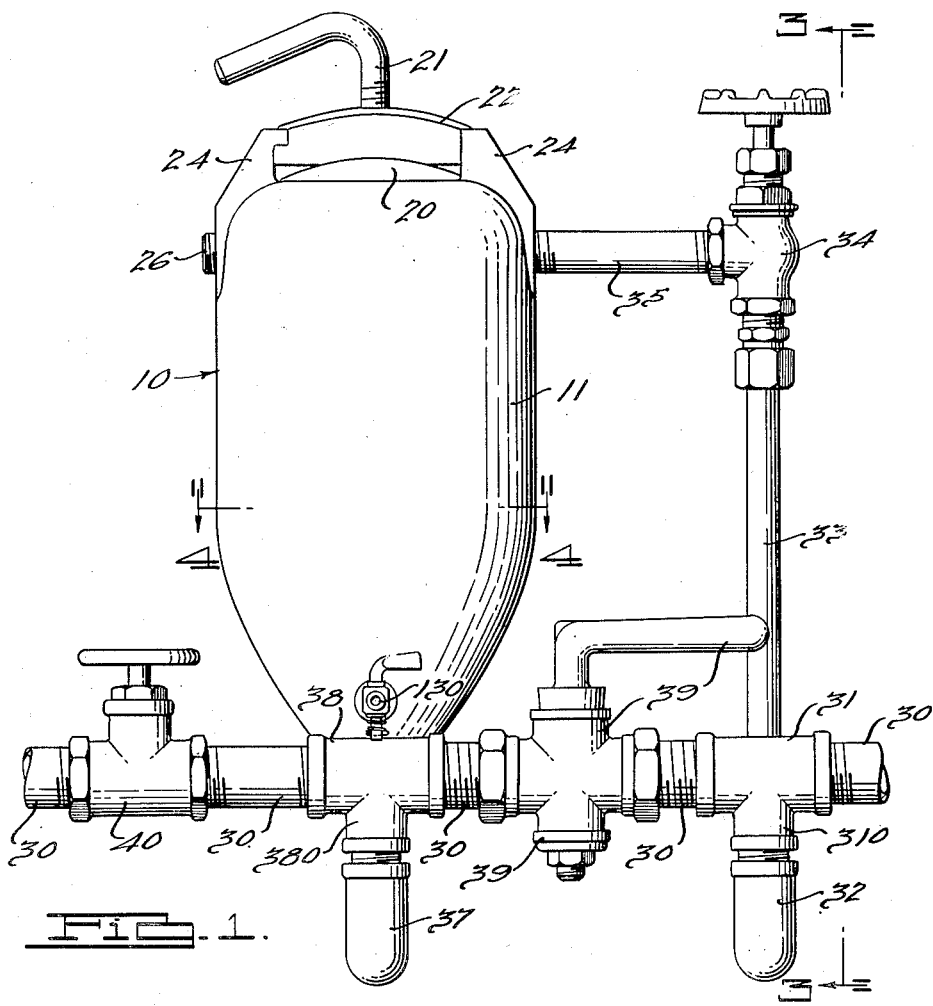
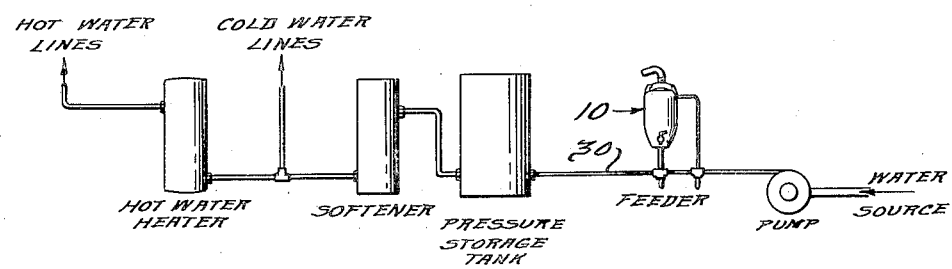
INVENTOR.
*Earl C. Reynolds.*
BY
*ATTORNEY*

Jan. 15, 1952     E. C. REYNOLDS     2,582,505
FEEDER
Filed April 29, 1949     2 SHEETS—SHEET 2
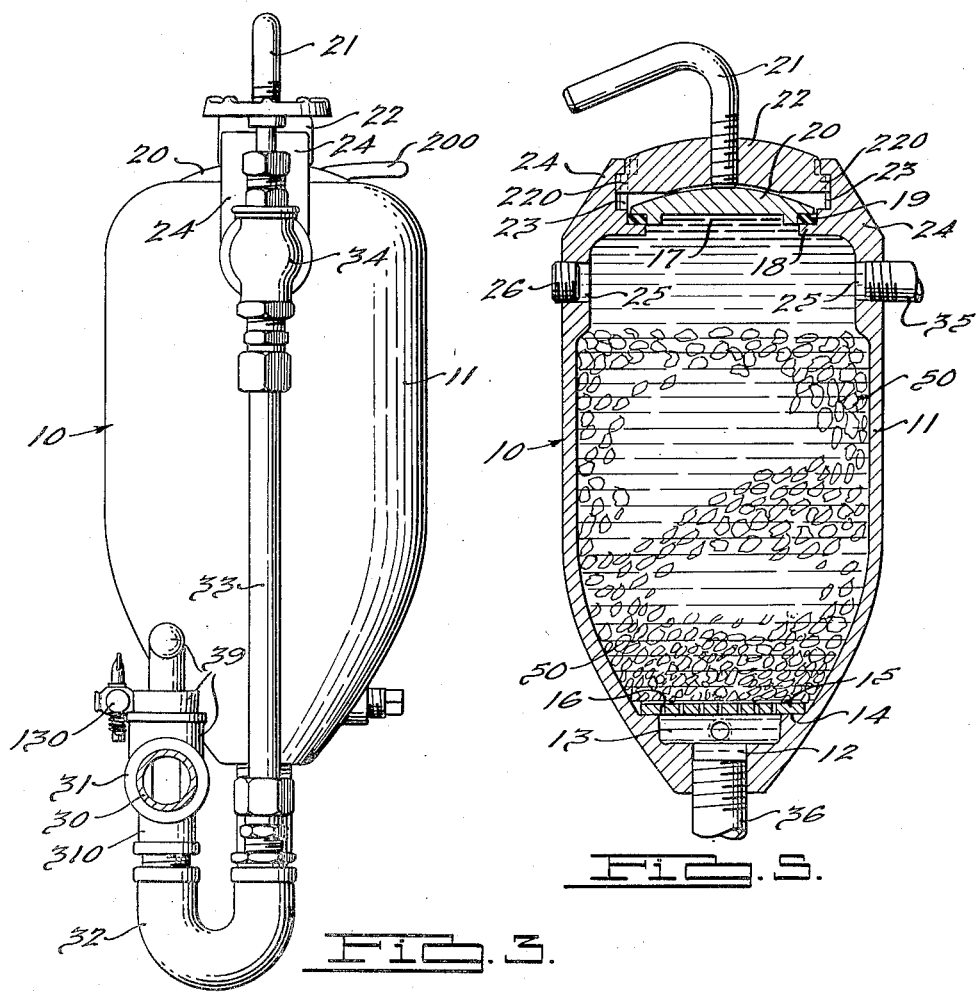
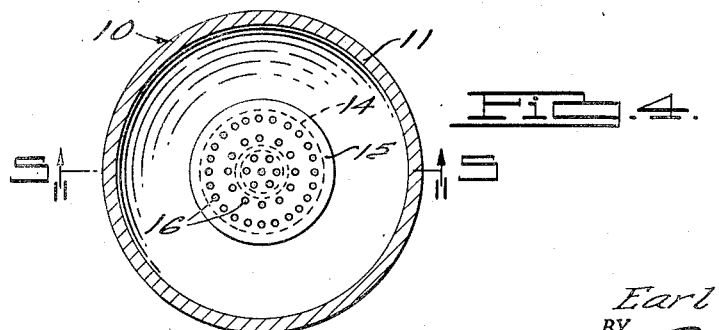
INVENTOR.
Earl C. Reynolds.
BY
ATTORNEY.

Patented Jan. 15, 1952

2,582,505

UNITED STATES PATENT OFFICE 2,582,505

FEEDER

Earl C. Reynolds, Detroit, Mich.

Application April 29, 1949, Serial No. 90,409

1 Claim. (Cl. 210—36)

This invention relates generally to chemical feeder systems and to feeders for feeding chemicals into water supply systems and the like.

In many water systems, particularly those which employ a pressure or booster pump and a pressure storage tank, air exists in the water lines or air is purposely introduced in the water lines at the pump whereby to supply air to the pressure water tank. In such installations and others, acid waters having a low pH value and other waters of a corrosive nature and water with high iron content require stabilization to prevent corrosive action which causes rusting and eventual destruction of piping, hot water heater tanks, hot water storage tanks, water softeners, and the like. The stabilization of such waters prevents rust accumulations throughout water and heating systems and delays separation of iron from hard water, and thus prevents rust staining of plumbing fixtures. The stabilization of such waters prevent the mineral beds of water softeners from acquiring accumulations of iron and rust, and thus insures the operation of water softeners at full capacity over a longer life than otherwise. This stabilization of acid waters having a low pH value and other waters of a corrosive nature and water with high iron content is often accomplished by such means as adding thereto a solution of water soluble crystalline phosphate, which, when fed into either private water supply systems or water supply lines from municipal water mains accomplish the foregoing benefits.

When water is supplied to a water system from municipal water mains, the chemical feeder is preferably placed near the meter so that the entire water system will be chemically treated to stabilize water for rust preventative purposes. When water is supplied by a local pump to a water system including a pressure storage tank, the feeder is preferably placed near the pump and between the pump and the pressure storage tank so that the water will be stabilized before it enters the storage tank to prevent rust accumulations in the storage tank and in the system therebeyond. Also, when water having a low pH value and other waters of a corrosive nature and water with high iron content is pumped directly through a water system, the feeder is installed as near to the pressure side of the pump as possible to prevent rust accumulations in the system therebeyond.

As previously indicated, water pumped to a pressure storage tank ofttimes has air added at the pump. Also, many water mains have air therein and water pumped from other sources contains some air in the form of bubbles. In all cases, the air carried through water lines follows the upper portion of the pipe passage or aperture, while the water in the bottom of the pipe passage or aperture is substantially free of air bubbles. If air becomes entrapped in the chemical feeder, it first becomes ineffective, and later ceases to function entirely.

Accordingly, the primary object of the invention is to provide a feeder for feeding a water soluble crystalline chemical into water supply systems and the like including an effective and novel installation therefor which, in the aggregate, assures a positive and uniform method and means for the feeding of chemicals into the water system without interruption and without stoppage due to air pockets forming in the feeder.

Other objects of the invention will become apparent by reference to the following detailed description taken in connection with the accompanying drawings, in which:

Fig. 1 is a front elevational view of a feeder for water soluble crystalline chemicals and chemical feeder system embodying the invention.

Fig. 2 is a diagrammatic view showing a water souble feeder and feeder system embodying the invention for feeding chemicals into a pressure domestic or commercial water supply system.

Fig. 3 is a side elevational view taken on the line 3—3 of Fig. 1.

Fig. 4 is a horizontal sectional view taken on the line 4—4 of Fig. 1.

Fig. 5 is a vertical sectional view taken on the line 5—5 of Fig. 4.

Referring now to the drawings wherein like numerals refer to like and corresponding parts throughout the several views, the particular embodiment of the invention disclosed therein comprises, in general, a feeder 10 for water soluble crystalline chemicals such as a slowly soluble crystalline phosphate composed of a hollow cylindrical pressure vessel 11 formed generally frusto-conoidal in shape at its lower end where it is bored and counterbored to provide an outlet passage 12, a well 13 having a pet cock 130 extending therefrom and an annular seat 14 to support a chemical supporting disc 15 having a plurality of apertures 16 therein, the said pressure vessel 11 being formed at the top thereof to provide a filling aperture 17 defined by an annular seat 18 to accommodate a resilient sealing washer 19 onto which a filler cap 20 is positioned, the said filler cap 20 having a handle 200 thereon being secured in place by a thrust screw 21 threaded into the center of a removable bridge 22 which is tongued at its ends 220 to fit into bayonet slots 23 formed in the ears 24 extending upwardly from opposite sides of the top of the pressure vessel 11, the said pressure vessel 11 having inlet apertures 25 on opposite sides and near the top thereof, one of which is plugged by a plug 26, the said feeder being connected into a water supply system in a specific and novel manner by means of suitable piping as hereinafter described in detail whereby to provide a reliable and trouble free chemical feeder system therefor.

Fig. 2 illustrates diagrammatically the preferred location of the feeder 10 when employed in a pump-pressure tank water system. As previously indicated, the feeder 10 may be used to feed a solution of water soluble crystalline chemicals into other types of water systems and the like. Of importance is the specific and novel system or method of connecting a feeder into the water line or the like with which it is employed, a typical disclosure of which is shown in Figs. 1 and 3.

Referring now particularly in Figs. 1 and 3 in which the connections of the feeder 10 to the water supply line 30 are shown in detail, the feeder 10 is positioned above the water supply line 30 and water is supplied to the feeder 10 from the water supply line 30 through a water take-off T-fitting 31 having its branch 310 downwardly disposed and connected to one end of a relatively sharp U-shaped loop or 180 degree bend 32, through a tube 33 extending upwardly from the other end of the U-shaped loop 32 to and through a shut-off valve 34, and then through a connection 35 into the unplugged inlet 25 of the feeder 10. Solution from the feeder 10 is supplied to the water supply line 30 from the outlet passage 12 of the said feeder 10 through a connection 36 to one end of a second relatively sharp U-shaped loop or 180 degree bend 37 and through the U-shaped loop 37 into the downwardly disposed branch 380 of a second or chemical solution supply T-fitting 38 in the water supply line 30. Between the water take-off T-fitting 31 and the chemical solution supply T-fitting 38 is disposed a regulator valve 39 employed to restrict the passage of water through the water supply line 30 between the water take-off 31 and the chemical supply 38 whereby to regulate the flow of chemical solution into the water supply line 30. A shut-off valve 40 is provided in the water supply line 30 beyond the chemical solution supply T-fitting 38 to facilitate the replenishing of the filter with crystalline chemicals.

To operate a chemical feeder system such as the one hereinabove described, the shut-off valves 34 and 40 are closed. Pressure within the feeder 10 is relieved by opening the pet cock 130. The filler cap 20 is then removed from the feeder 10 after first loosening the thrust screw 21 and removing the bridge 22. This permits all water to drain out of the feeder 10 through the pet cock 130 which is then closed. The feeder 10 and the reticulated or perforated chemical supporting disc 15 are thoroughly cleaned, the chemical supporting disc 15 is replaced, and the feeder 10 is filled with the desired water soluble crystalline chemical such as a slowly soluble phosphate crystals employing suitable sized crystals or lumps 50 so that a reasonable flow of water through the crystals will be assured. The shut-off valve 34 is then opened slightly to allow the feeder 10 to become completely filled with water. The filler cap 20 is then replaced, the bridge 22 is then placed in the bayonet slots 23 of the ears 24, and the thrust screw 21 is tightened. The shut-off valve 34 is now fully opened, and the shut-off valve 40 is opened whereupon the feeder 10 is in service.

When the feeder 10 is first installed, it is best to turn the regulator valve 39 to as near closed as possible to divert as much as possible of the water from the water supply line 30 through the feeder 10 without undue restriction of the total flow of water through the water supply line 30. This assures an adequate initial treatment of the water to clean iron deposits from the pipes, pressure storage tank, water softener, hot water heater and faucets. After about thirty days, less flow through the feeder will be required. To determine this, close the regulator valve 39 slightly. Draw a glass of water from a faucet in the plumbing system and let it stand for about 12 hours. If there are no rust deposits, try again. Repeat until a slight sign of rust deposits is evident, each time closing the regulator valve 39 slightly more. As soon as rust deposits are revealed, open the regulator valve to the last position where rust deposits did not reveal themselves. The correct meeting for the regulator valve will have been established.

With the particular installation of the feeder 10 and the employment of the U-shaped loops 32 and 37 in connecting the said feeder 10 to the water supply line 30 as herein described, air will not accumulate or become entrapped in the top of the feeder 10 to an extent that will make it ineffective or inoperative. Thus, is provided an inexpensive and reliable method and means for the chemical treatment of water with solution from soluble chemical crystals or lumps without complicated or expensive mechanism.

Although but a single embodiment of the invention has been disclosed and described in detail, it is obvious that many changes may be made in the size, shape, arrangement and detail of the various elements of the invention without departing from the spirit and scope thereof as defined by the appended claim.

I claim:

A feeder system for feeding a solution of soluble crystalline chemicals into a water line responsive to water passing through the water line and the feeder comprising a feeder in the form of a pressure vessel having a well in the bottom thereof and a reticulated chemical support over the said well, a generally vertical inlet connection from the water line to a side of the said feeder near the top thereof and a generally vertical outlet connection from the bottom of the well of the said feeder to the said water line, the top of the said pressure vessel having a chemical filler aperture therein and removable means for sealing the said filler aperture, the feeder being disposed above the water supply line and the said generally vertical inlet and outlet connections between the said feeder and the said water line being in the form of relatively sharp U-shaped loops connected at one end to the bottom of the said water line, and a regulator valve governing the relative flow of water through the water line and feeder disposed in the water line between the said U-shaped loops.

EARL C. REYNOLDS.

REFERENCES CITED

The following references are of record in the file of this patent:

UNITED STATES PATENTS

| Number | Name | Date |
|---|---|---|
| 373,867 | Trowbridge | Nov. 29, 1887 |
| 452,172 | West | May 12, 1891 |
| 510,112 | Blessing | Dec. 5, 1893 |
| 530,684 | Gibbons | Dec. 11, 1894 |
| 1,173,365 | McComb | Feb. 29, 1916 |
| 1,524,257 | Kensig | Jan. 27, 1925 |
| 1,710,301 | Earl | Apr. 23, 1929 |
| 2,137,755 | Glynn | Nov. 22, 1938 |
| 2,462,886 | Morrow | Mar. 1, 1949 |

FOREIGN PATENTS

| Number | Country | Date |
|---|---|---|
| 2,643 | Great Britain | 1910 |
| 10,394 | Great Britain | 1910 |